United States Patent
Hiroi et al.

(10) Patent No.: US 11,030,524 B2
(45) Date of Patent: Jun. 8, 2021

(54) INFORMATION PROCESSING DEVICE AND INFORMATION PROCESSING METHOD

(71) Applicant: SONY CORPORATION, Tokyo (JP)

(72) Inventors: Toshiyuki Hiroi, Tokyo (JP); Makiko Yamamoto, Tokyo (JP); Akira Nakamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 16/479,044

(22) PCT Filed: Jan. 26, 2018

(86) PCT No.: PCT/JP2018/002404
§ 371 (c)(1),
(2) Date: Jul. 18, 2019

(87) PCT Pub. No.: WO2018/198454
PCT Pub. Date: Nov. 1, 2018

(65) Prior Publication Data
US 2020/0387781 A1 Dec. 10, 2020

(30) Foreign Application Priority Data
Apr. 28, 2017 (JP) .............................. JP2017-089144

(51) Int. Cl.
*G06F 17/11* (2006.01)
*G06N 3/08* (2006.01)
(Continued)

(52) U.S. Cl.
CPC ............... *G06N 3/08* (2013.01); *G06F 17/11* (2013.01); *G06F 17/16* (2013.01); *G06N 3/00* (2013.01); *G06N 3/04* (2013.01)

(58) Field of Classification Search
CPC ... G06N 3/08; G06N 3/00; G06N 3/04; G06F 17/11; G06F 17/16
(Continued)

(56) References Cited

U.S. PATENT DOCUMENTS 5,651,090 A * 7/1997 Moriya ................. G10L 19/008
704/200.1
6,131,083 A * 10/2000 Miseki .................... G10L 19/07
704/217
(Continued)

FOREIGN PATENT DOCUMENTS

JP 2006-180093 A 7/2006

OTHER PUBLICATIONS

Mar. 10, 2020, Japanese Decision to Grant a Patent issued for related JP Application No. 2019-156062.
(Continued)

*Primary Examiner* — Michael T Tran
(74) *Attorney, Agent, or Firm* — Paratus Law Group, PLLC

(57) ABSTRACT

There is provided an information processing device to reduce a processing load associated with inner product operations while also guaranteeing the quantization granularity of weight coefficients, the information processing device including: a computational unit configured to compute an output value by performing an inner product operation based on multiple input values and multiple weight coefficients corresponding to each of the input values. The computational unit computes the output value on the basis of the weight coefficients quantized on the basis of a granularity of a vector direction on an N-dimensional hypersphere surface. Moreover, provided is an information processing device including: a multiply-accumulate operation circuit configured to execute a multiply-accumulate operation
(Continued)

based on multiple input values and multiple weight coefficients corresponding to each of the input values. The multiply-accumulate operation circuit includes a memory circuit configured to hold address information and a multiplication circuit configured to execute operations.

9 Claims, 11 Drawing Sheets

(51) Int. Cl.
*G06F 17/16* (2006.01)
*G06N 3/00* (2006.01)
*G06N 3/04* (2006.01)

(58) Field of Classification Search
USPC .................................................. 706/26, 28
See application file for complete search history.

(56) References Cited

U.S. PATENT DOCUMENTS

| | | | | |
|---|---|---|---|---|
| 6,356,213 | B1* | 3/2002 | Huang | G06T 9/004 341/60 |
| 6,665,646 | B1* | 12/2003 | John | G10L 19/167 704/500 |
| 7,120,587 | B2* | 10/2006 | Heusdens | G10L 21/0364 704/500 |
| 7,958,071 | B2* | 6/2011 | Snider | G06N 3/063 706/26 |
| 8,332,216 | B2* | 12/2012 | Kurniawati | G10L 19/02 704/229 |
| 8,392,176 | B2* | 3/2013 | Garudadri | G10L 19/08 704/205 |
| 8,725,501 | B2* | 5/2014 | Ehara | G10L 19/005 704/226 |
| 8,812,305 | B2* | 8/2014 | Geiger | G10L 19/265 704/205 |
| 8,990,132 | B2* | 3/2015 | Lo | G06N 3/049 706/20 |
| 9,916,837 | B2* | 3/2018 | Deng | H04L 65/602 |
| 9,978,379 | B2* | 5/2018 | Vilermo | G10L 19/008 |
| 2003/0220889 | A1* | 11/2003 | Shi | G06N 3/063 706/26 |
| 2010/0169254 | A1* | 7/2010 | Su | H03G 3/3042 706/23 |
| 2010/0312735 | A1* | 12/2010 | Knoblauch | G06N 3/0445 706/25 |

OTHER PUBLICATIONS

Machado et al., FPGA Implementation of a Feedforward Neural Network-Based Classifier Using the xQuant Technique, Proceedings of 2017 IEEE $8^{th}$ Latin American Symposium on Circuits and Systems, Feb. 20, 2017, pp. 1-4, ISSN: 2473-4667, IEEE.
Feb. 25, 2020, Japanese Notice of Transfer to Pretrial Reexamination issued for related JP Application No. 2019-156062.
Nov. 12, 2019, Japanese Decision of Final Rejection issued for related JP Application No. 2019-156062.
Nov. 12, 2019, Japanese Decision of Dismissal of Amendment issued for related JP Application No. 2019-156062.
Sep. 24, 2019, Japanese Notice of Rejection issued for related JP Application No. 2019-156062.
Itay Hubara et al., Quantized Neural Networks: Training Neural Networks with Low Precision Weights and Activations, arXiv, Sep. 22, 2016, pp. 1-29.
Joachim Ott et al., Recurrent Neural Networks With Limited Numerical Precision, arXiv, Nov. 21, 2016, pp. 1-6.
Mohammad Rastegari et al., XNOR-Net: ImageNet Classification Using Binary Convolutional Neural Networks, arXiv, Aug. 2, 2016, pp. 1-17.
Sampatrao L. Pinjare et al., Implementation of Artificial Neural Network Architecture for Image Compression Using CSD Multiplier, Proceedings of International Conference on "Emerging Research in Computing, Information, Communication and Applications" ERCICA-13, Aug. 2013, pp. 581-587.

* cited by examiner

| | | |
|---|---|---|
| pointer TO Cell(j=1) | + | 1 |
| Offset = 1 | + | 0 |
| Offset = 2 | − | 0 |
| Offset = 1 | + | 0 |
| ⋮ | ⋮ | ⋮ |
| pointer TO Cell(j=N) | − | 1 |

WT

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2018/002404 (filed on Jan. 26, 2018) under 35 U.S.C. § 371, which claims priority to Japanese Patent Application No. 2017-089144 (filed on Apr. 28, 2017), which are all hereby incorporated by reference in their entirety.

TECHNICAL FIELD

The present disclosure relates to an information processing device and an information processing method.

BACKGROUND ART

Recently, mathematical models called neural networks that resemble the workings of neural systems are receiving attention. Also, various techniques for reducing the processing load of computations in a neural network are being proposed. For example, Non-Patent Literature 1 describes a technique of reducing the processing load by making weight coefficients binary. Also, Non-Patent Literature 2 describes a technique of converting multiplication to addition by converting an input signal to a logarithmic domain.

CITATION LIST

Non-Patent Literature

Non-Patent Literature 1: Matthieu Courbariaux et al., "BinaryConnect: Training Deep Neural Networks with binary weights during propagations", [online], Nov. 11, 2015, arXiv, [retrieved Mar. 22, 2017], Internet <URL: https://arxiv.org/pdf/1511.00363.pdf>

Non-Patent Literature 2: Daisuke Miyashita et al., "Convolutional Neural Networks using Logarithmic Data Representation", [online], Mar. 3, 2016, arXiv, [retrieved Mar. 22, 2017], Internet <URL: https://arxiv.org/pdf/1603.01025.pdf>

DISCLOSURE OF INVENTION

Technical Problem

However, with the technique described in Non-Patent Literature 1, since binarization using +1 or −1 is performed, the quantization granularity is expected to become rougher as the dimensionality of the weight coefficients increases. Also, the technique described in Non-Patent Literature 2, although having a predetermined effect in the avoidance of multiplication, is anticipated to have room for further improvement in the reduction of the processing load.

Accordingly, the present disclosure proposes a novel and improved information processing device and information processing method capable of further reducing the processing load associated with inner product operations while also guaranteeing the quantization granularity of weight coefficients.

Solution to Problem

According to the present disclosure, there is provided an information processing device including: a computational unit configured to compute an output value by performing an inner product operation based on multiple input values and multiple weight coefficients corresponding to each of the input values. The computational unit computes the output value on the basis of the weight coefficients quantized on the basis of a granularity of a vector direction on an N-dimensional hypersphere surface.

Moreover, according to the present disclosure, there is provided an information processing device including: a multiply-accumulate operation circuit configured to execute a multiply-accumulate operation based on multiple input values and multiple weight coefficients corresponding to each of the input values. The multiply-accumulate operation circuit includes a memory circuit configured to hold address information of the input values corresponding to the multiple weight coefficients reordered in order of smallest value, and a multiplication circuit configured to execute operations based on the input values acquired by the address information and the weight coefficients.

Moreover, according to the present disclosure, there is provided an information processing method, executed by a processor, including: computing an output value by performing a multiply-accumulate operation based on multiple input values and multiple weight coefficients corresponding to each of the input values. The computing additionally includes computing the output value on the basis of the weight coefficients quantized on the basis of a granularity of a vector direction on an N-dimensional hypersphere surface.

Advantageous Effects of Invention

According to the present disclosure as described above, it becomes possible to further reduce the processing load associated with inner product operations while also guaranteeing the quantization granularity of weight coefficients.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
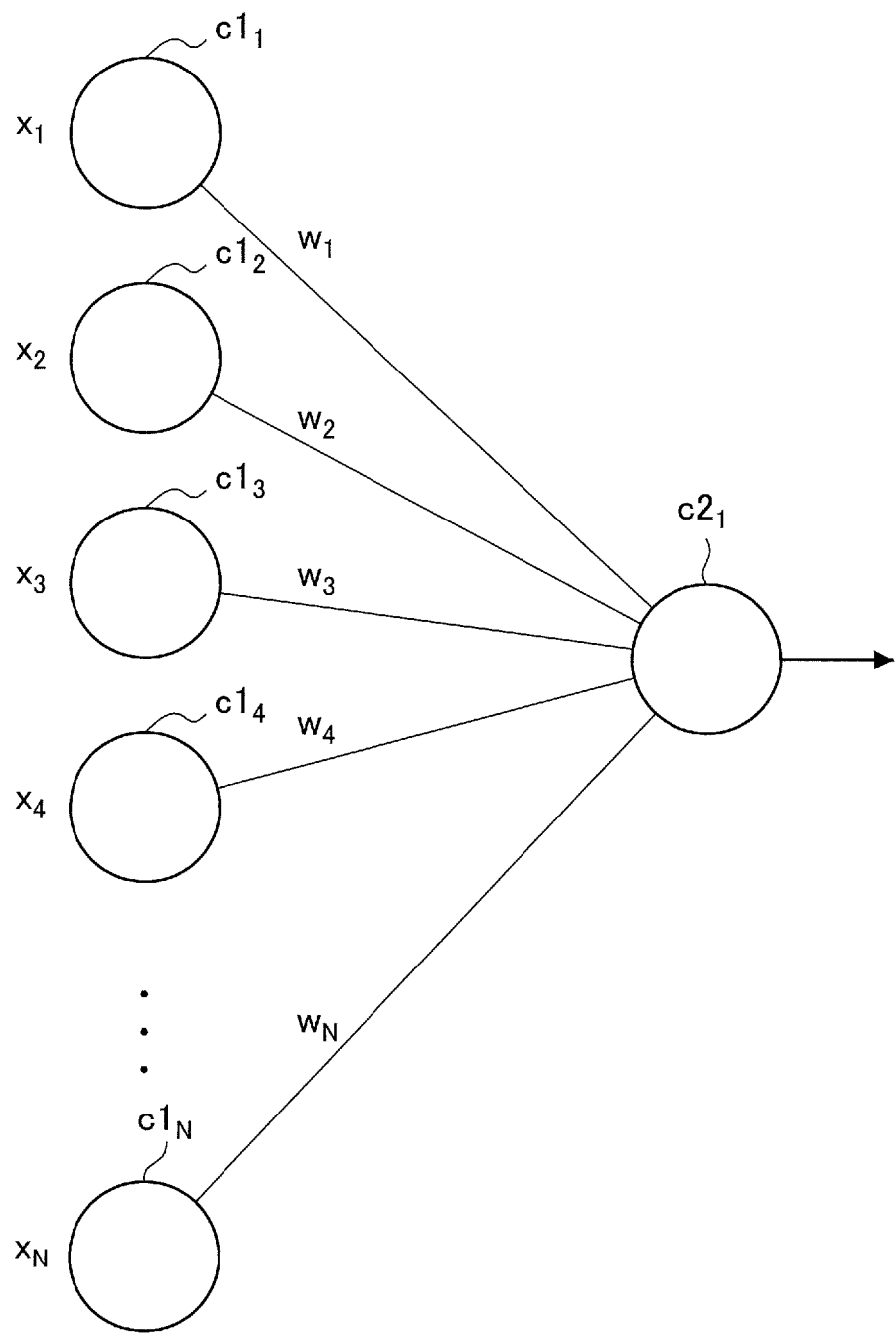
FIG. 1 is a conceptual diagram for explaining an overview of basic computations in a neural network according to a related technology of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Embodiment
1.1. Background
1.2. Exemplary functional configuration of information processing device 10
1.3. Weight vector quantization
1.4. Exemplary configuration of multiply-accumulate operation circuit
1.5. Quantization during learning
1.6. Effects
2. Exemplary hardware configuration
3. Conclusion

1. EMBODIMENT

<<1.1. Background>>

Recently, learning techniques using neural networks, such as deep learning, are being researched widely. Although learning techniques using neural networks are highly accurate, because of the large processing load associated with computation, there is demand for computational methods that reduce the processing load effectively.

For this reason, in recent years, computational methods that aim to reduce the amount of computation and the amount of information, such as binary weight networks and XNMOR nets, for example, have also been proposed.

Herein, an overview of basic computations in a typical neural network will be described. FIG. 1 is a conceptual diagram for explaining an overview of basic computations in a neural network. FIG. 1 illustrates two layers forming the neural network, and cells $c1_1$ to $c1_N$ and a cell $c2_1$ belonging to each of the two layers.

At this point, the input signal (hereinafter also designated the input vector) input into the cell $C2_1$ is decided on the basis of the input vector and weight coefficients (hereinafter also designated the weight vector) associated with the cells $c1_1$ to $c1_N$ belonging to the lower layer. More specifically, the input vector input into the cell $c2_1$ becomes a value obtained by adding a bias b to the result of an inner product operation of the input vector and the weight vector associated with the cells $c1_1$ to $c1_N$, and additionally processing by an activation function h.

In other words, in the case of taking $x=(x_1, x_2, x_3, \ldots x_N)$ and $w=(w_1, w_2, w_3, \ldots w_N)$ to be each of the input vector and the weight vector associated with the cells $c1_1$ to $c1_N$, an input vector z input into the cell $c2_1$ is defined by the following Formula (1).

[Math. 1]

$$z=h(\Sigma x_i w_i + b) \quad (1)$$

Figure 2:
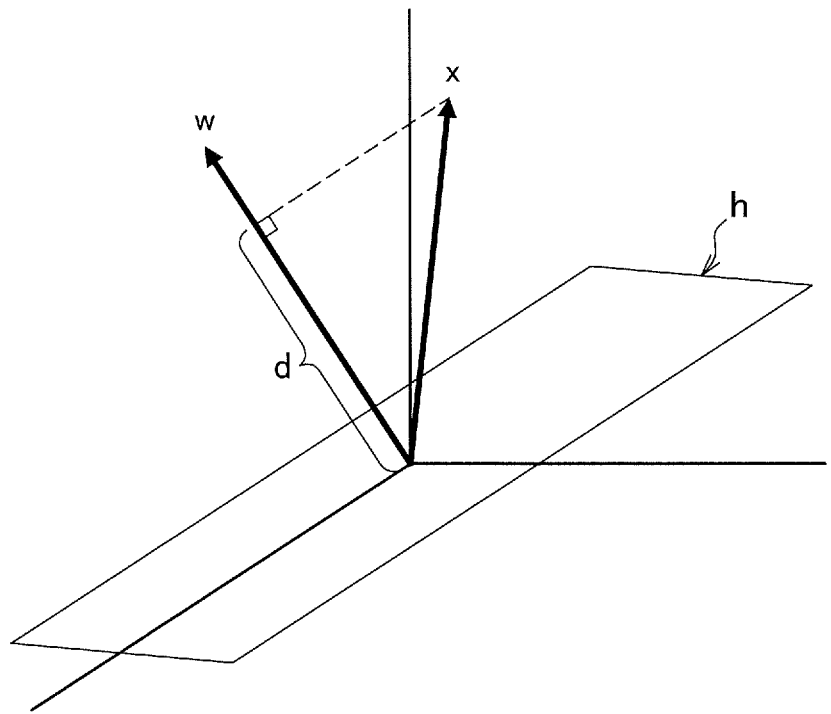
FIG. 2 is an overview diagram for explaining an inner product operation of an input vector and a weight vector according to a related technology of the present disclosure.

At this point, assuming a hyperplane h whose normal is the weight vector w, as illustrated in FIG. 2, the inner product of the input vector x and the weight vector w expressed in N dimensions can be expressed as the value obtained by multiplying $\|w\|$ by a projection distance d of projecting the input vector x onto the weight vector w based on the hyperplane h. Herein, the above $\|w\|$ is the norm of the vector w. FIG. 2 is an overview diagram for explaining the inner product operation of the input vector x and the weight vector w.

Figure 3:
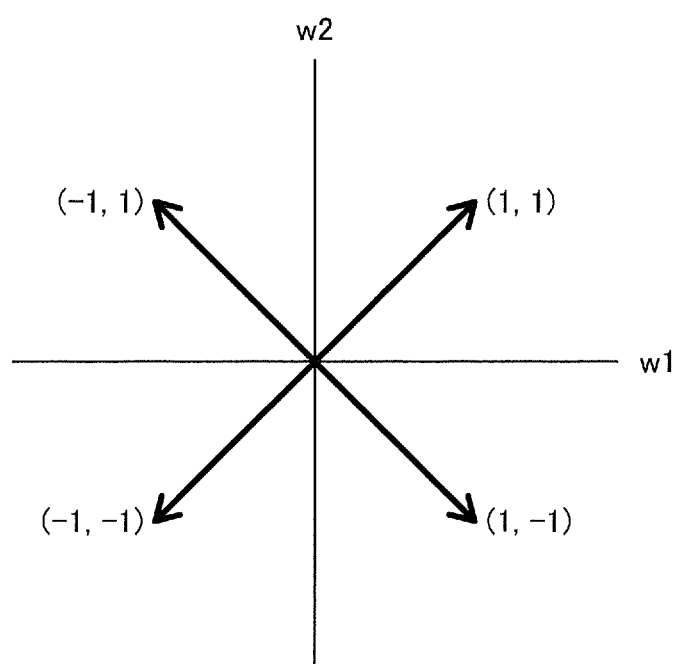
FIG. 3 is a diagram for explaining a binary-quantized weight vector in a two-dimensional space according to a related technology of the present disclosure.

At this point, in the case in which the input vector x and the weight vector w are two-dimensional, if the weight vector w is quantized into a binary value of +1 or −1 like in Non-Patent Literature 1, the weight vector w can be represented as in FIG. 3. FIG. 3 is a diagram for explaining the binary-quantized weight vector w in a two-dimensional space. At this point, the granularity of the weight vector w can be expressed by a rotational angle $\theta$ in the plane, and as illustrated in FIG. 3, the granularity becomes 90 degrees.

Figure 4:
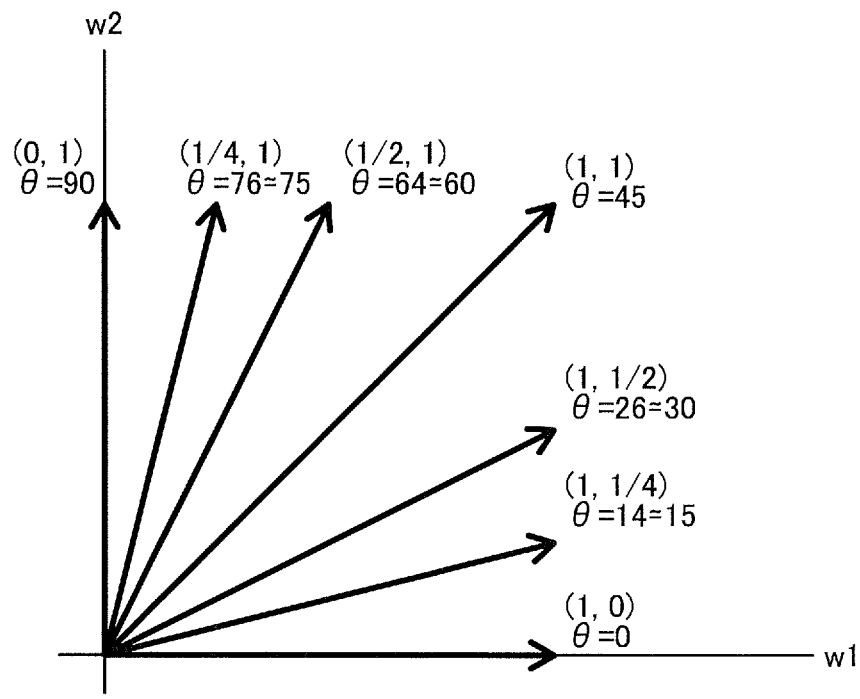
FIG. 4 is a diagram for explaining a quaternary-quantized weight vector in a two-dimensional space according to a related technology of the present disclosure.

Next, consider the case of quantizing the weight vector w into the quaternary values of $\{0, ¼, ½, 1\}$. FIG. 4 is a diagram for explaining the quaternary-quantized weight vector w in a two-dimensional space. In this case, the granularity of the weight vector w, or in other words the rotational angle $\theta$, becomes approximately 15 degrees, making it possible to guarantee a finer granularity compared to the case of binary quantizing.

Figure 5:
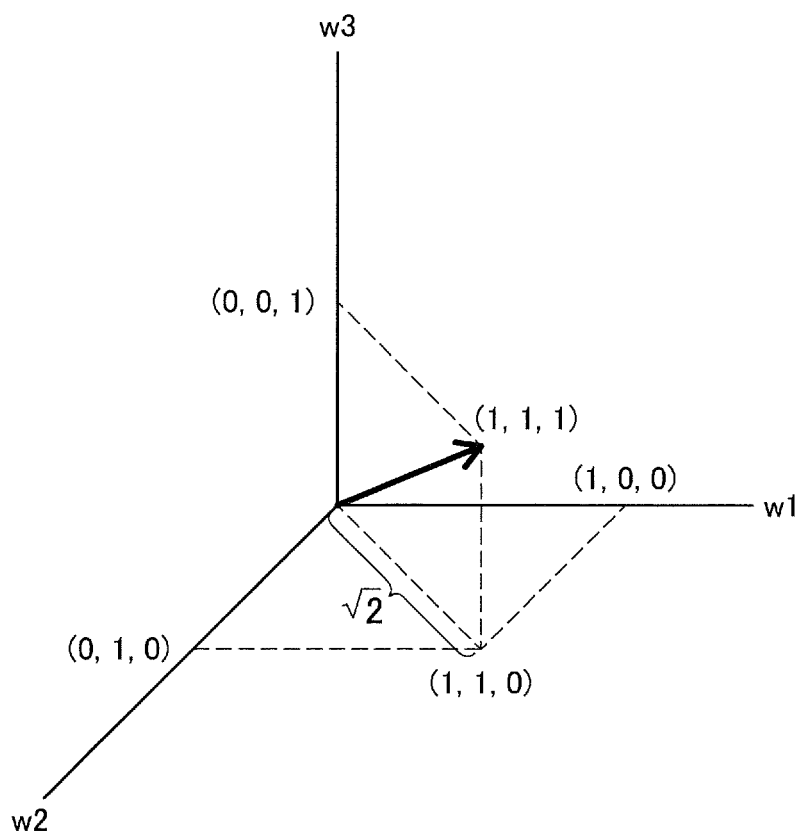
FIG. 5 is a diagram for explaining discrepancies in the granularity of a weight vector in a three-dimensional space according to a related technology of the present disclosure.

On the other hand, discrepancies in the granularity of the weight vector w are expected to become larger as the dimensionality increases. FIG. 5 is a diagram for explaining discrepancies in the granularity of the weight vector w in a three-dimensional space. For example, as illustrated in FIG. 5, in the case of considering the quantizing of the weight vector w in a plane defined by (1, 1, 0) and (0, 0, 1), the length of the side in the (1, 1, 0) direction becomes the length of the side in the (0, 0, 1) direction multiplied by the square root of 2, thereby demonstrating that discrepancies in the granularity during quantization increase.

Figure 6:
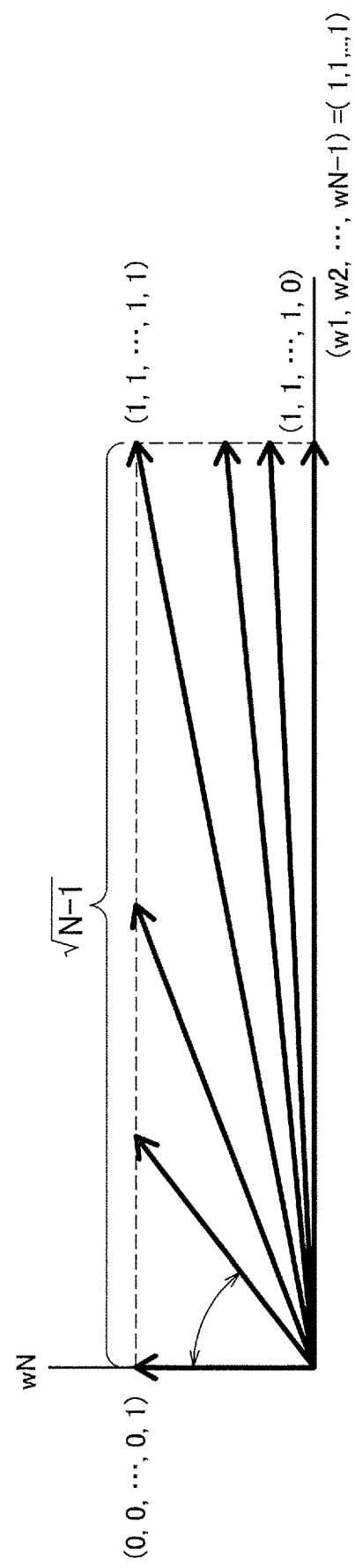
FIG. 6 is a diagram for explaining discrepancies in the granularity of a weight vector in an N-dimensional space according to a related technology of the present disclosure.

Also, these discrepancies, or in other words non-uniformity, of the granularity like the above become more prominent as the dimensionality increases. FIG. 6 is a diagram for explaining discrepancies in the granularity of the weight vector w in an N-dimensional space. FIG. 6 illustrates a plane defined by $(1, 1, \ldots, 1, 0)$ and $(0, 0, \ldots, 0, 1)$ in an N-dimensional space. In this case, the length of the side in the $(1, 1, \ldots, 1, 0)$ direction can be expressed by the length of the side in the $(0, 0, \ldots, 0, 1)$ direction multiplied by the square root of (N−1). For example, in the case of N=100, the length of the side in the 1, 1, . . . , 1, 0) direction becomes the length of the side in the (0, 0, . . . , 0, 1) direction multiplied by the square root of 99 ($\approx$10).

Since non-uniformity in the granularity associated with the weight vector w as above may be a factor causing a performance drop in a neural network, a more accurate quantization technique is desired. The technical idea according to the present disclosure was conceived by focusing on the above point, and makes it possible to reduce the processing load effectively while also maintaining high accuracy in the approximation of a weight vector in an N-dimensional space. For this reason, one feature of the information processing device and information processing method according to one embodiment of the present disclosure is to execute an inner product operation using a weight vector quantized on the basis of the granularity of a vector direction in an N-dimensional hypersphere plane. The information processing device and information processing method according to one embodiment of the present disclosure are capable of achieving both high approximation accuracy and a reduction in the processing load by quantizing the weight vector with a granularity that is not too fine and not too coarse. More specifically, the information processing device and information processing method according to one embodiment of the present disclosure preferably executes an inner product operation using a weight vector expressed by exponentiation. Hereinafter, the above features included in the information processing device and the information processing method according to one embodiment of the present disclosure will be described in detail.

<<1.2. Exemplary Functional Configuration of Information Processing Device 10>>

Figure 7:
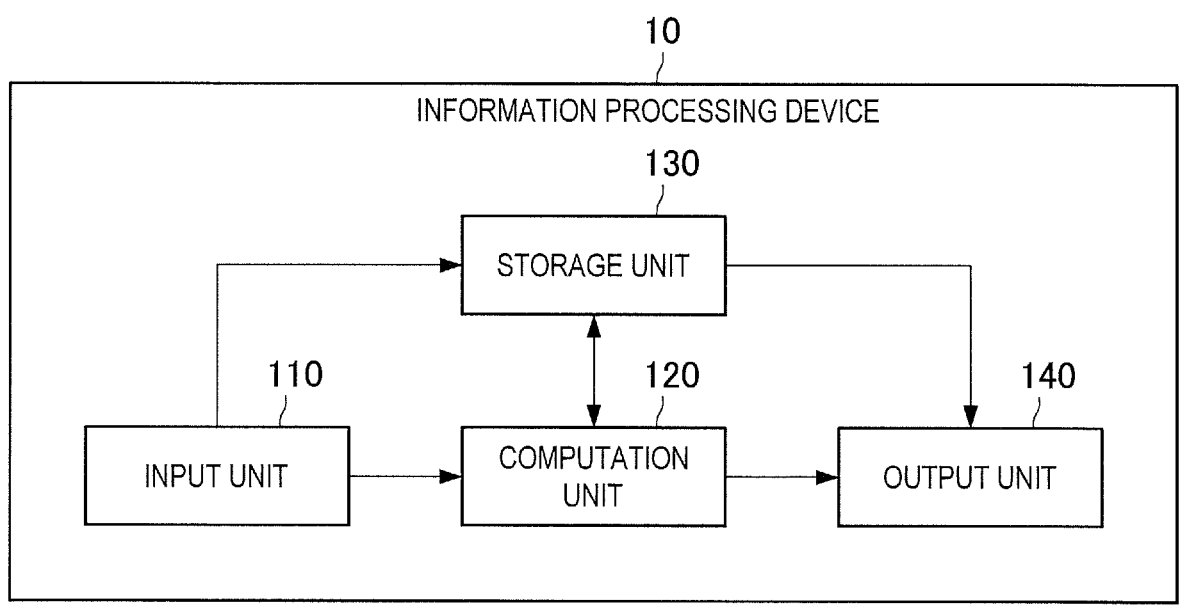
FIG. 7 is one example of a function block diagram of an information processing device according to one embodiment of the present disclosure.

Next, an exemplary functional configuration of the information processing device 10 that realizes the information processing method according to the present embodiment will be described. FIG. 7 is one example of a function block diagram of the information processing device 10 according to the present embodiment. Referring to FIG. 7, the information processing device 10 according to the present embodiment is provided with an input unit 110, a computation unit 120, a storage unit 130, and an output unit 140. Hereinafter, the description of the above configuration will focus on the functions included in the configuration.

(Input Unit 110)

The input unit 110 according to the present embodiment has a function of detecting various types of input operations by an operator. For this reason, the input unit 110 according to the present embodiment preferably includes various devices for detecting input operations by the operator. For example, the input unit 110 may be realized by any of various types of buttons, a keyboard, a touch panel, a mouse, a switch, and the like.

(Computation Unit 120)

The computation unit 120 has a function of performing inner product operations based on multiple input values and multiple weight coefficients corresponding to each of the input values, and computing an output value. Particularly, the computation unit 120 according to the present embodiment performs inner product operations associated with the forward propagation of a neural network. At this point, one feature of the computation unit 120 according to the present embodiment is to compute an output value on the basis of weight coefficients quantized on the basis of the granularity of a vector direction on an N-dimensional hypersphere surface. More specifically, the computation unit 120 according to the present embodiment preferably computes an output value on the basis of weight coefficients expressed by exponentiation. The features of the inner product operations in the present embodiment will be described separately later.

(Storage Unit 130)

The storage unit 130 has a function of storing programs, data, and the like used by each configuration element provided in the information processing device 10. For example, the storage unit 130 according to the present embodiment stores various parameters and the like used in a neural network.

(Output Unit 140)

The output unit 140 has a function of outputting various information to the operator. For this reason, the output unit 140 according to the present embodiment may include a display device that outputs visual information. Herein, the above display device may be realized by a cathode ray tube (CRT) display device, a liquid crystal display (LCD) device, an organic light-emitting diode (OLED) device, or the like, for example.

The above describes an exemplary functional configuration of the information processing device 10 according to the present embodiment. Note that the exemplary functional configuration described above is merely one example, and the exemplary functional configuration of the information processing device 10 according to the present embodiment is not limited to such an example. The information processing device 10 according to the present embodiment may also be provided additionally with configuration elements other than those illustrated in FIG. 1. For example, the information processing device 10 may be provided additionally with a communication unit that communicates information with another information processing terminal, and the like. The functional configuration of the information processing device 10 according to the present embodiment may be flexibly changed in design.

<<1.3. Weight Vector Quantization>>

Next, the quantization of weight vectors according to the present embodiment will be described in detail. As described above, the information processing device 10 according to the present embodiment is able to maintain highly uniform granularity by executing quantization with weight vectors w expressed by exponentiation. At this point, one feature of the computation unit 120 according to the present embodiment is to reorder multiple weight vectors $w_i$ in order of smallest value, and also normalize the multiple weight vectors $w_i$ by the weight coefficient $w_i$ with the largest value. At this point, if the reordered and normalized weight vectors are taken to be $w_j$, the weight vectors $w_j$ are indicated by the following Formulas (2) to (4).

[Math. 2]

$$w_j = s_j \alpha^{n_j} (j < N) \qquad (2)$$

$$w_N = 1 \qquad (3)$$

$$w_j \leq w_{j+1} \qquad (4)$$

However, at this point, in the above Formula (2), $\alpha$ preferably is $0 < \alpha < 1$, $s_j$ preferably is an element of the set $\{-1, 1\}$, and $n_j$ preferably is an element of the set $\{0, 1, 2, \ldots\}$. In other words, the computation unit 120 according to the present embodiment performs quantization treating $n_j$ as integers. In this case, the inner product operation executed by the computation unit 120 is indicated by the following Formula (5). Note that in the following Formula (5), K denotes a normalization constant. Also, it is sufficient for the value of $\alpha$ above to fall ultimately within the above range in the inner product operation, even in the case of appropriately transforming the following Formula (5). The formulas illustrated in the present disclosure are merely one example, and may be flexibly transformed.

[Math. 3]

$$K((\ldots (s_1 x_1 \alpha^{n_1-n_2}+s_2 x_2) \alpha^{n_2-n_3}+s_3 x_3) \alpha^{n_3-n_4}+ \ldots )\alpha^{n_{N-1}}+s_N x_N), K \in R \quad (5)$$

For this reason, the inner product operation by the computation unit 120 according to the present embodiment is expected to be processable by N addition operations and the number of times of multiplications on the order of $-\frac{1}{2}\log(N-1)/\log \alpha$.

In this way, one feature of the information processing method according to the present embodiment is to approximate the weight vectors w by an exponential representation of $\alpha$, and reorder the weight vectors w in order of smallest value. At this point, in the information processing method according to the present embodiment, by converting the exponents of $\alpha$ to k-ary values according to N, the weight vectors w are quantized.

For example, for the case in which N=100, in the information processing method according to the present embodiment, k=4 (2-bit), 8 (3-bit), 16 (4-bit) or the like may be adopted. By setting k as above, since most of $n_1-n_2$, $n_2-n_3$, $n_3-n_4$, and so on in Formula (5) above become 0 due to quantized by the same value, it becomes possible to greatly reduce the number of times of multiplications. To give a more specific example, in the case in which k=4 with respect to N=100, $n_{j-1}-n_j$ takes a value other than 0 only four times. For this reason, in the case of this example, the number of times of multiplications associated with the inner product operation is merely four while the rest become additions, making it possible to effectively reduce the processing load.

<<1.4. Exemplary Configuration of Multiply-Accumulate Operation Circuit>>

Next, a multiply-accumulate operation circuit that realizes the computational method according to the present embodiment will be described. As described above, in the case of quantizing according to an exponential representation and then reordering the weight vectors w, it is also necessary to correspondingly reorder the input vectors x corresponding to the weight vectors w.

For this reason, the information processing device 10 according to the present embodiment preferably is provided with a multiply-accumulate operation circuit including a table that holds address information of the input vectors x corresponding to the multiple weight vectors w reordered in order of smallest value.

Figure 8:
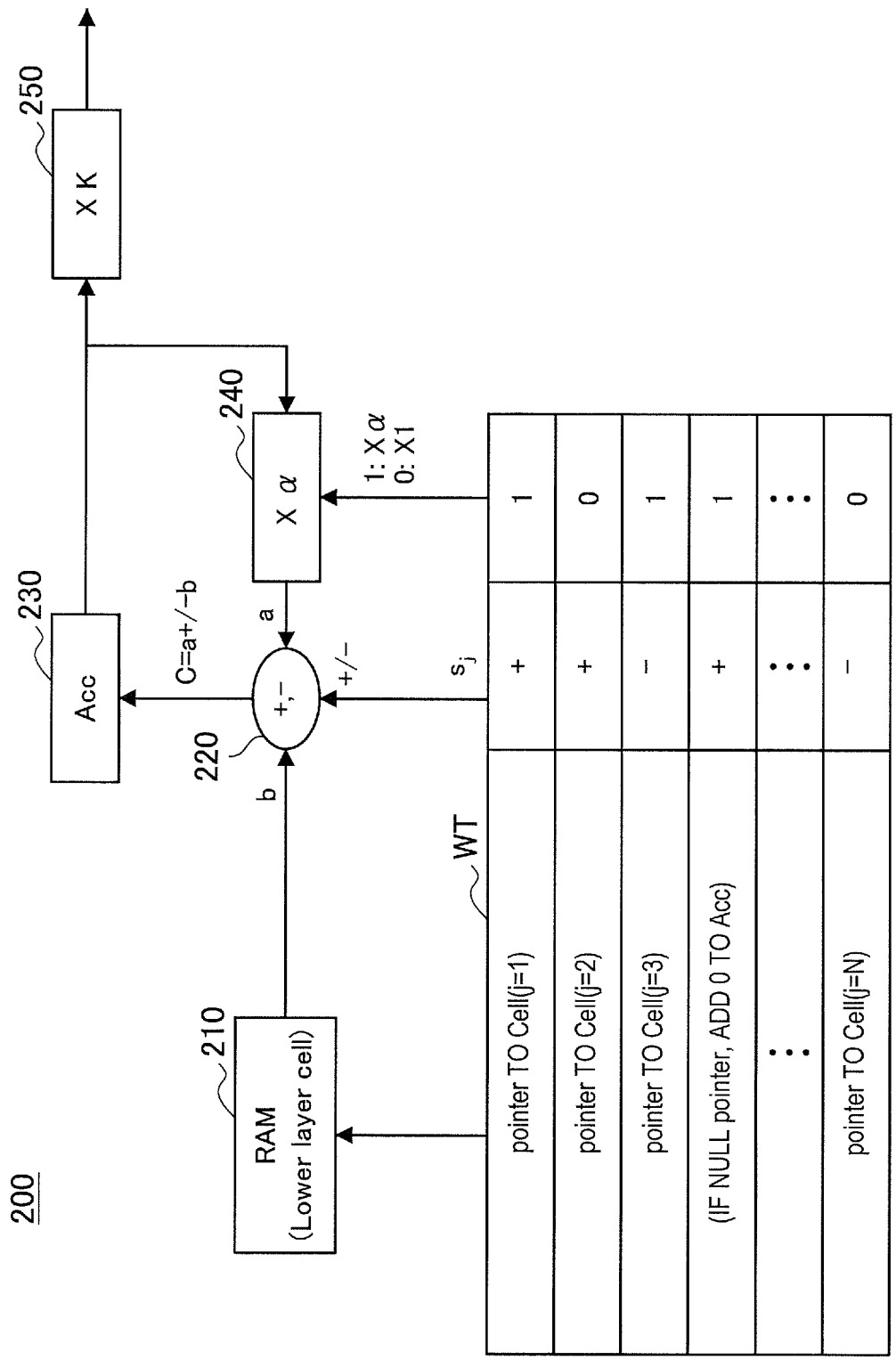
FIG. 8 is one example of a circuit block diagram of a multiply-accumulate operation circuit provided in the information processing device according to the embodiment.

FIG. 8 is one example of a circuit block diagram of a multiply-accumulate operation circuit 200 provided in the information processing device 10 according to the present embodiment. As illustrated in FIG. 8, the multiply-accumulate operation circuit according to the present embodiment is provided with a memory circuit that holds a table WT storing address information of the input vectors x corresponding to the weight vectors w, RAM 210, an addition circuit 220, an accumulator 230, a first multiplication circuit 240 that performs multiplications associated with $\alpha$, and a second multiplication circuit 250 that performs multiplications associated the normalization constant.

(Address Table WT)

The address table WT according to the present embodiment holds address information of the input vectors x corresponding to the multiple weight vectors w reordered in order of smallest value, sign information, and multiplication instruction information. Note that, as illustrated in FIG. 8, the above address information may also include a null pointer. In this case, 0 is added to the accumulator 230, making it possible to simply multiply the value of the accumulator 230 by $\alpha$. Also, the above sign information is information indicating a value corresponding to $S_j$ in Formula (5) described above.

Also, the above multiplication instruction information is information giving an instruction about the content of the processing by the first multiplication circuit 240. The multiplication instruction information according to the present embodiment preferably includes information designating whether or not to multiply, for example. FIG. 8 illustrates one example of a case in which the first multiplication circuit 240 does not multiply in the case in which the multiplication instruction information is 0, and the first multiplication circuit 240 multiplies by a in the case in which the multiplication instruction information is 1.

Note that the multiplication instruction information according to the present embodiment is not limited to the above example, and may include designating various types of processing content. For example, the multiplication instruction information according to the present embodiment may include information designating the number of times of multiplications, shift operations, or the like.

(RAM 210)

The RAM 210 according to the present embodiment outputs the input vectors x corresponding to the weight vectors w to the addition circuit 220 on the basis of address information input from the address table WT (Addition Circuit 220)

The addition circuit 220 according to the present embodiment executes addition on the basis of the input vectors x input from the RAM 210 and a value output from the first multiplication circuit 240. At this point, the addition circuit 220 according to the present embodiment performs the above addition on the basis of the sign information held in the address table WT.

(Accumulator 230)

The accumulator 230 according to the present embodiment accumulates the computational results output from the addition circuit 220. The accumulator 230 outputs the accumulated value to the first multiplication circuit 240 and the second multiplication circuit 250. Also, a reset signal for resetting the accumulated value to 0 is input into the accumulator 230 when appropriate.

(First Multiplication Circuit 240)

The first multiplication circuit 240 according to the present embodiment multiplies the value accumulated by the accumulator 230 by $\alpha$. At this point, as described above, the first multiplication circuit 240 executes the above multiplication on the basis of the multiplication instruction information held in the address table WT. The first multiplication circuit 240 outputs the computational result to the addition circuit 220.

(Second Multiplication Circuit 250)

The second multiplication circuit 250 according to the present embodiment multiplies the value output from the accumulator 230 by the normalization constant K.

The above describes an exemplary configuration of the multiply-accumulate operation circuit 200 according to the present embodiment. With the multiply-accumulate operation circuit 200 according to the present embodiment, it becomes possible to effectively reduce the number of times of multiplications in inner product operations, and reduce the processing load.

Figures 9, 10:
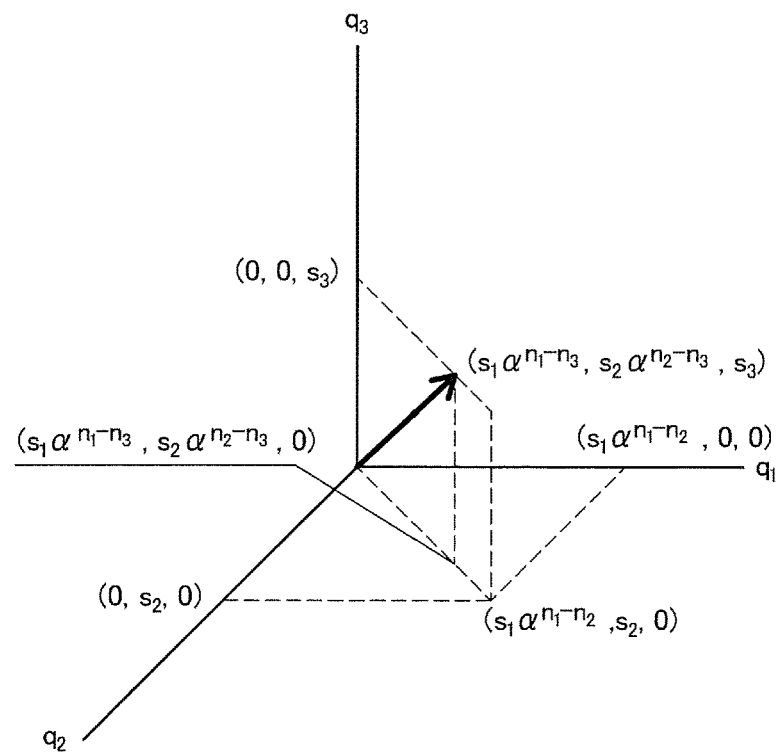
FIG. 9 is one example of an offset notation for address information stored in an address table according to the embodiment.
FIG. 10 is a diagram illustrating a process representation of the information processing method according to the embodiment.

On the other hand, since the capacity of the address table WT according to the present embodiment increases due to holding the address information of the input vectors x, power consumption is also expected to increase. For this reason, as illustrated in FIG. 9, the address table WT may also include offsets indicating relative positions between addresses. FIG. 9 is one example of an offset notation for address information stored in the address table WT according to the present embodiment.

As illustrated in FIG. 9, the address table WT according to the present embodiment may sort addresses in a segment where the value of $n_{j-1}-n_j$ in Formula (5) described above is continuously 0, or in other words, a segment in which multiplication is not performed, in order of address, and hold offsets between the addresses as address information. With the address table WT above according to the present embodiment, the amount of information associated with address information is greatly reduced, making it possible to effectively reduce power consumption.

Note that the address table WT according to the present embodiment may take a variety of modes other than the formats illustrated in FIGS. 8 and 9. For example, the address table WT according to the present embodiment does not have to hold the sign information and the multiplication instruction information with a clear separation between the two, and may also adopt an address compression method other than the above. The address table WT according to the present embodiment may be modified flexibly according to the configuration of the neural network and the performance of the information processing device 10.

<<1.5. Quantization During Learning>>

Next, the quantization of the weight vectors $w_i$ during learning according to the present embodiment will be described. In the information processing method according to the present embodiment, it is possible to calculate the update of the weight vectors $w_i$ during learning according to the following Formula (6).

[Math. 4]

$$n_i = \text{int}(\log|w_i/w_{max}|/\log \alpha) \quad (6)$$

However, $w_{max}$ in the above Formula (6) indicates the maximum value of $w_i$. Also, the integer function int may select to either round up or round down, whichever is closer. In the information processing method according to the present embodiment, by reordering $n_i$ during the final learning, the address table WT described above can be generated.

Note that in the case of setting α close to 1, it is also possible to adopt a technique of performing computations using a learning algorithm according to a deep neural network (DNN) using ordinary floating-point arithmetic and quantizing $w_i$ after learning ends. In other words, in the case of a small quantization granularity associated with the weight vectors w, an effect of not lowering the recognition accuracy even without modifying the network structure is anticipated.

<<1.6. Effects>>

Next, the effects exhibited by the quantization of weight vectors according to the present embodiment will be described in detail. As described above, in the information processing method according to the present embodiment, $w_j$ is defined by reordering the $w_i$ quantized by an exponential representation in order of smallest value and normalizing. At this point, if the reordered basis vectors are taken to be $q_j$, the weight vectors w are indicated by the following Formula (7).

[Math. 5]

$$\begin{aligned} w &= \Sigma w_j q_j \\ &= ((\ldots(s_1 q_1 \alpha^{n_1-n_2} + s_2 q_2)\alpha^{n_2-n_3} + \\ &\quad s_3 q_3)\alpha^{n_3-n_4} + \ldots)\alpha^{n_N-1} + s_N q_N) \end{aligned} \quad (7)$$

In other words, as illustrated in FIG. 10, the information processing method according to the present embodiment means creating vectors in the plane formed by the weight vectors projected onto the space stretched by $q_1, q_2, \ldots q_{j-1}$ and $q_j$, and repeating a process of multiplying the vectors by $\alpha^{n_j-n_{j+1}}$. FIG. 10 is a diagram illustrating a process representation of the information processing method according to the present embodiment.

Figure 11:
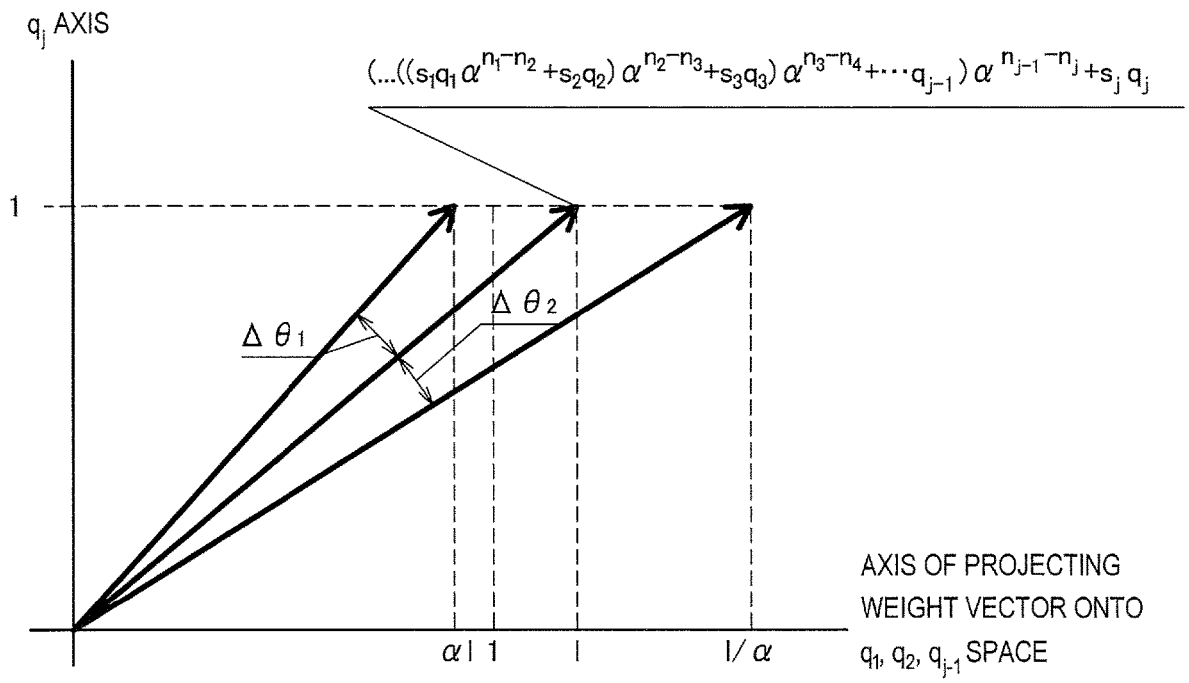
FIG. 11 is a diagram for explaining a quantization granularity $\Delta\theta$ according to the embodiment.

For this reason, in the information processing method according to the present embodiment, in the plane stretched by the axis obtained by projecting a weight vector onto the $q_1, q_2, \ldots q_{j-1}$ space and $q_j$, as illustrated in FIG. 11, the quantization granularity $\Delta\theta$ of the weight vectors can be expressed as counter-clockwise rotation and clockwise rotation by each of the following Formulas (8) and (9). However, at this point, 1 in Formulas (8) and (9) is defined by Formula (10). FIG. 11 is a diagram for explaining the quantization granularity $\Delta\theta$ according to the present embodiment. Note that in FIG. 11, weight vectors projected onto the first quadrant are illustrated.

[Math. 6]

$$\Delta\theta_1 = \tan^{-1}\frac{1}{\alpha l} - \tan^{-1}\frac{1}{l} \quad (8)$$

$$\Delta\theta_2 = \tan^{-1}\frac{1}{l} - \tan^{-1}\frac{\alpha}{l} \quad (9)$$

$$l = \|((\ldots(s_1 q_1 \alpha^{n_1-n_2} + s_2 q_2)\alpha^{n_2-n_3} + s_3 q_3)\alpha^{n_3-n_4} + \ldots q_{j-1})\alpha^{n_{j-1}-n_j}\| \quad (10)$$

Also, in the case in which the quantization granularities $\Delta\theta_1$ and $\Delta\theta_2$ return 0 when differentiated by 1, the maximum value of each is defined according to the following Formula (11).

[Math. 7]

$$\Delta\theta_{1max} = \Delta\theta_{2max} = \tan^{-1}\frac{1}{\sqrt{\alpha}} - \tan^{-1}\sqrt{\alpha} \quad (11)$$

Figure 12:
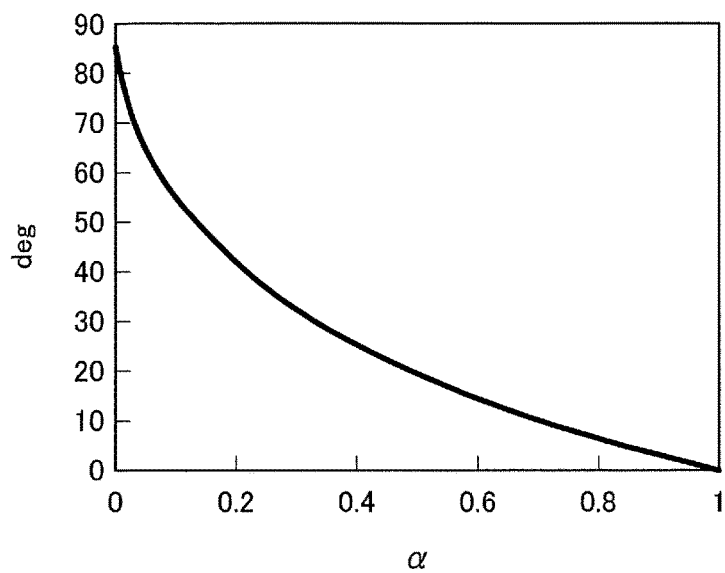
FIG. 12 is a graph illustrating a maximum value of the quantization granularity $\Delta\theta$ according to $\alpha$ according to the embodiment.

FIG. 12 is a graph illustrating the maximum value of the quantization granularity $\Delta\theta$ according to α according to the present embodiment. In this way, with the information processing method according to the present embodiment, in an N-dimensional space, the quantization granularity is guaranteed in all orthogonal rotation directions.

Figure 13:
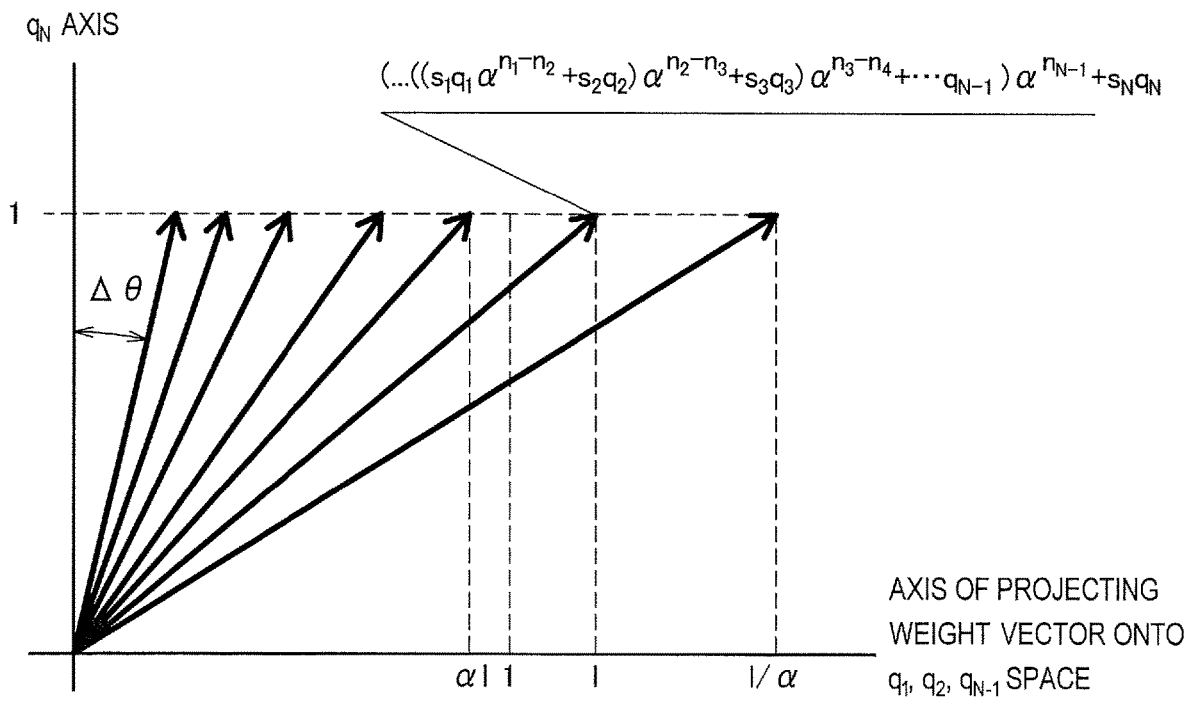
FIG. 13 is a diagram for explaining a maximum exponent according to the embodiment.

Note that in the case of stopping the exponentiation operation partway through, as illustrated in FIG. 13, the quantization granularity $\Delta\theta$ remains. FIG. 13 is a diagram for explaining a maximum exponent according to the present embodiment. Note that in FIG. 13, weight vectors projected onto the first quadrant are illustrated. At this point, for the maximum exponent guaranteeing the quantization granularity $\Delta\theta$, it is sufficient to add the following Formula (13) to the smallest m satisfying the following Formula (12). Consequently, the number of times of multiplications executed by the information processing device 10 according to the present embodiment can be computed by the following Formula (14).

[Math. 8]

$$\tan^{-1}\alpha^m < \tan^{-1}\frac{1}{\sqrt{\alpha}} - \tan^{-1}\sqrt{\alpha} \quad (12)$$

$$-\frac{1}{2}\frac{\log(N-1)}{\log \alpha} \quad (13)$$

$$\frac{\log\left(\tan\left(\tan^{-1}\frac{1}{\sqrt{\alpha}} - \tan^{-1}\sqrt{\alpha}\right)\right)}{\log \alpha} - \frac{1}{2}\frac{\log(N-1)}{\log \alpha} + 1 \quad (14)$$

Figure 14:
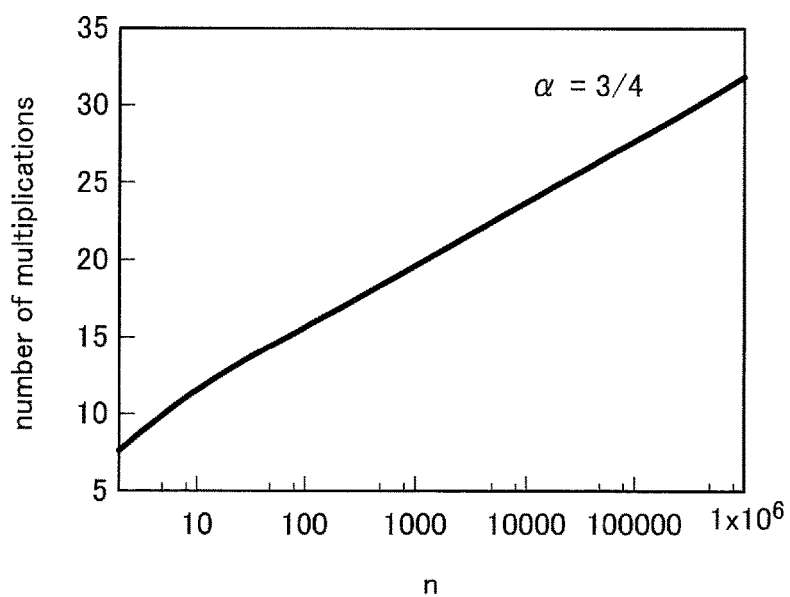
FIG. 14 is a diagram illustrating an example of the number of times of multiplications with respect to the number of inputs N according to the embodiment.
Figure 15:
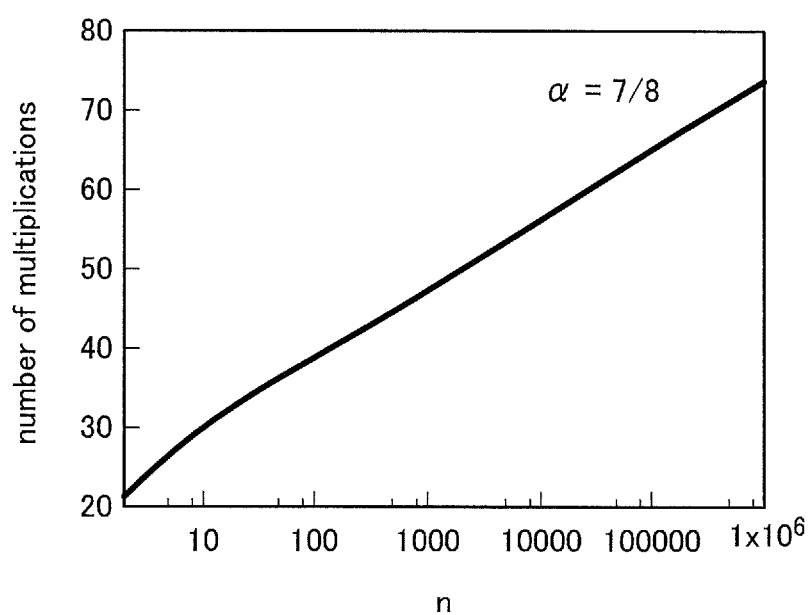
FIG. 15 is a diagram illustrating an example of the number of times of multiplications with respect to the number of inputs N according to the embodiment.

For example, in the case in which $\alpha=\frac{3}{4}$, the number of times of multiplications with respect to the number of inputs N is decided like the graph illustrated in FIG. 14. Also, for example, in the case in which $\alpha=\frac{7}{8}$, the number of times of multiplications with respect to the number of inputs N is decided like the graph illustrated in FIG. 15. In other words, in the inner product operations by the computation unit 120 according to the present embodiment, the number of times of multiplications may be considered to be determined on the basis of the value of the base of the weight vectors. FIGS. 14 and 15 are diagrams illustrating examples of the number of times of multiplications with respect to the number of inputs N according to the present embodiment.

As described above, with the information processing device that realizes the information processing method according to the present embodiment, in the inner product operations in the forward propagation of the neural network, the number of times of multiplications can be reduced greatly, making it possible to effectively reduce power consumption by the multiply-accumulate operation circuit 20. Also, with the information processing device that realizes the information processing method according to the present embodiment, the quantization accuracy of the weight vectors can be improved, and compared to a quantization technique of the related art in which the same numbers of bits are used, an effect of improving the recognition accuracy and the approximation accuracy by the neural network is anticipated.

2. HARDWARE CONFIGURATION EXAMPLE

Figure 16:
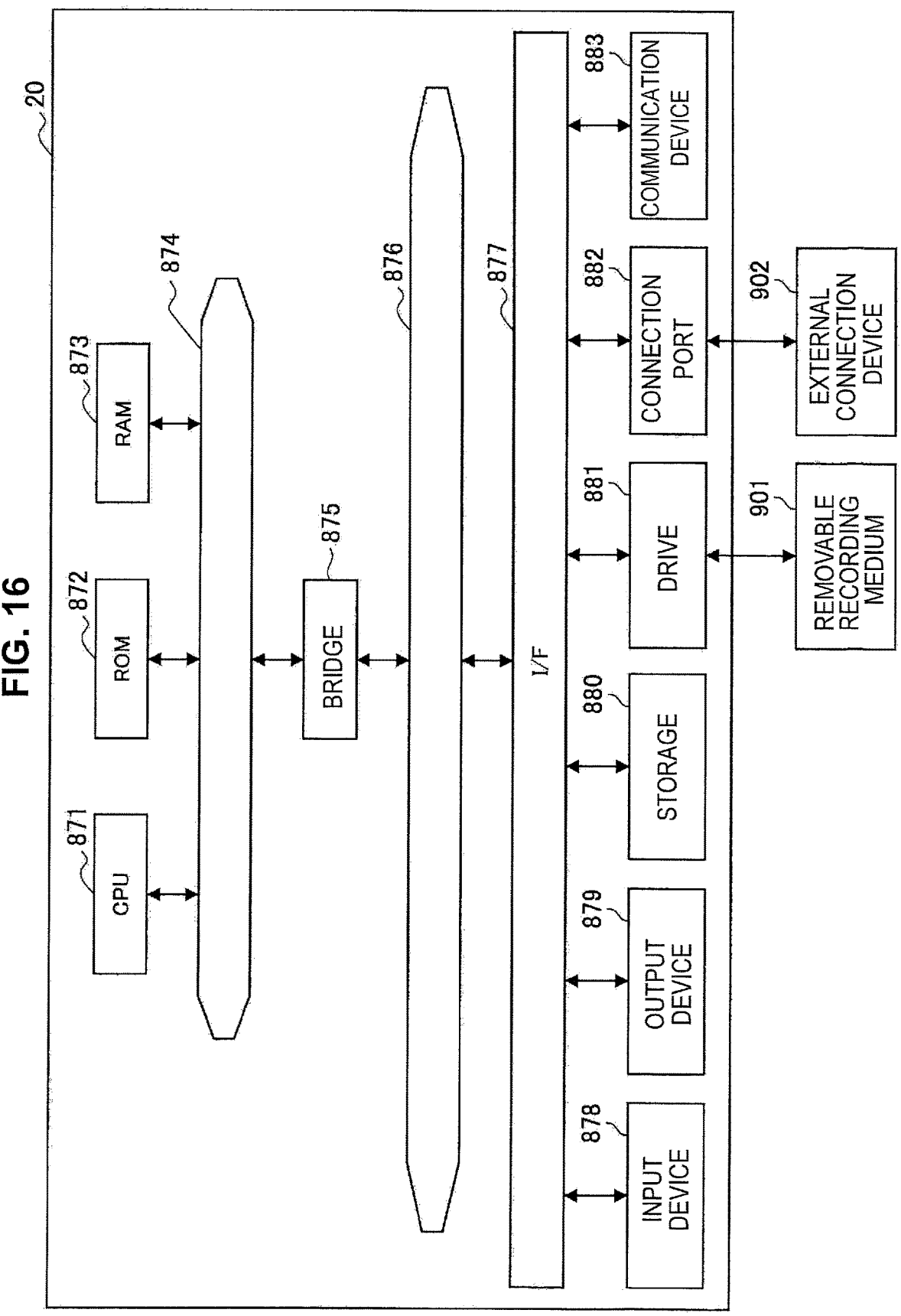
FIG. 16 is a diagram illustrating an exemplar hardware configuration according to one embodiment of the present disclosure.

An example of the hardware configuration common to the information processing device 10 according to an embodiment of the present disclosure is now described. FIG. 16 is a block diagram illustrating an example of the hardware configuration of the information processing device 10 according to an embodiment of the present disclosure. Referring to FIG. 16, the information processing device 10 includes, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.
(CPU 871)

The CPU 871 functions as, in one example, an arithmetic processing unit or a control device, and controls some or all of the operations of each component on the basis of various programs recorded in the ROM 872, the RAM 873, the storage 880, or a removable recording medium 901.
(ROM 872 and RAM 873)

The ROM 872 is a means for storing programs loaded into the CPU 871, data used for operation, or the like. The RAM 873 temporarily or permanently stores, in one example, a program to be loaded into the CPU 871, various parameters appropriately changing in executing the program, or the like.
(Host Bus 874, Bridge 875, External Bus 876, and Interface 877)

The CPU 871, the ROM 872, and the RAM 873 are mutually connected via, in one example, the host bus 874 capable of high-speed data transmission. On the other hand, the host bus 874 is connected to the external bus 876 having a relatively low data transmission rate, in one example, via the bridge 875. In addition, the external bus 876 is connected to various components via the interface 877.
(Input Device 878)

Examples of the input device 878 include a mouse, a keyboard, a touch panel, buttons, a switch, a lever, or the like. Furthermore, examples of the input device 878 include a remote controller capable of transmitting a control signal using infrared rays or other radio waves (hereinafter referred to as a remote controller). In addition, the input device 878 includes a speech input device such as a microphone.
(Output Device 879)

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like. In addition, the output device 879 according to the present disclosure includes any of various types of vibration devices capable of outputting a tactile stimulus.
(Storage 880)

The storage 880 is a device used to store various types of data. Examples of the storage 880 include a magnetic storage device such as hard disk drives (HDDs), a semiconductor storage device, an optical storage device, a magneto-optical storage device, or the like.
(Drive 881)

The drive 881 is a device that reads information recorded on the removable recording medium 901 such as a magnetic disk, an optical disk, a magneto-optical disk, or semiconductor memory or writes information to the removable recording medium 901.
(Removable Recording Medium 901)

Examples of the removable recording medium 901 include a DVD medium, a Blu-ray (registered trademark) medium, an HD DVD medium, various kinds of semiconductor storage media, or the like. Of course, the removable recording medium 901 is preferably, in one example, an IC card or an electronic device mounted with a contactless IC chip.
(Connection Port 882)

The connection port 882 is a port used for connection with an external connection device 902, such as a universal serial bus (USB) port, an IEEE 1394 port, a small computer system interface (SCSI), an RS-232C port, or an optical audio terminal.
(External Connection Device 902)

Examples of the external connection device 902 include a printer, a portable music player, a digital camera, a digital video camera, an IC recorder, or the like.

(Communication Device 883)

The communication device 883 is a communication device used for connection with a network, and examples thereof include a communication card for wired or wireless LAN, Bluetooth (registered trademark), or wireless USB (WUSB), a router for optical communication, a router for asymmetric digital subscriber line (ADSL), or a modem for various communications.

3. CONCLUSION

As described above, one feature of the information processing device according to the present embodiment is to use weight vectors quantized on the basis of a granularity of a vector direction on an N-dimensional hypersphere surface to perform inner product operations of the weight vectors and corresponding input vectors. According to such a configuration, it becomes possible to further reduce the processing load associated with inner product operations while also guaranteeing the quantization granularity of weight coefficients.

The preferred embodiment(s) of the present disclosure has/have been described above with reference to the accompanying drawings, whilst the present disclosure is not limited to the above examples. A person skilled in the art can find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure can achieve other effects that are clear to those skilled in the art from the description of this specification.

Additionally, the present technology may also be configured as below.

(1)

An information processing device including:

a computational unit configured to compute an output value by performing an inner product operation based on multiple input values and multiple weight coefficients corresponding to each of the input values, in which the computational unit computes the output value on the basis of the weight coefficients quantized on the basis of a granularity of a vector direction on an N-dimensional hypersphere surface.

(2)

The information processing device according to (1), in which the computational unit computes the output value on the basis of the weight coefficients expressed by exponentiation.

(3)

The information processing device according to (2), in which a base of the weight coefficients is determined to be a value greater than 0 but less than 1 in the inner product operation by the computational unit.

(4)

The information processing device according to (2) or (3), in which the number of times of multiplications in the inner product operation is determined on the basis of a value of a base of the weight coefficients.

(5)

The information processing device according to any of (1) to (4), in which the computational unit performs the inner product operation on the basis of the multiple weight coefficients reordered in order of smallest value.

(6)

The information processing device according to (5), in which the computational unit performs the inner product operation on the basis of the multiple weight coefficients normalized by the weight coefficient with a largest value.

(7)

The information processing device according to (5) or (6), in which the computational unit performs the inner product operation by acquiring the input values on the basis of a table that holds address information of the input values corresponding to the multiple weight coefficients reordered in order of smallest value.

(8)

The information processing device according to (7), in which the address information includes an offset indicating a relative position between addresses.

(9)

The information processing device according to (7) or (8), in which the table additionally holds multiplication instruction information associated with the address information.

(10)

The information processing device according to (9), in which the multiplication instruction information at least includes information designating whether or not to multiply.

(11)

The information processing device according to any of (7) to (10), in which the table additionally holds sign information associated with the address information.

(12)

The information processing device according to any of (1) to (11), in which the computational unit performs the inner product operation in association with a forward propagation of a neural network.

(13)

An information processing device including:

a multiply-accumulate operation circuit configured to execute a multiply-accumulate operation based on multiple input values and multiple weight coefficients corresponding to each of the input values, in which the multiply-accumulate operation circuit includes a memory circuit configured to hold address information of the input values corresponding to the multiple weight coefficients reordered in order of smallest value, and a multiplication circuit configured to execute operations based on the input values acquired by the address information and the weight coefficients.

(14)

An information processing method, executed by a processor, including:

computing an output value by performing a multiply-accumulate operation based on multiple input values and multiple weight coefficients corresponding to each of the input values, in which the computing additionally includes computing the output value on the basis of the weight coefficients quantized on the basis of a granularity of a vector direction on an N-dimensional hypersphere surface.

REFERENCE SIGNS LIST 10 information processing device
110 input unit
120 computation unit
130 storage unit
140 output unit
200 multiply-accumulate operation circuit
210 RAM
220 addition circuit
230 accumulator
240 first multiplication circuit
250 second multiplication circuit
WT address table

The invention claimed is:

1. An information processing device comprising:
a computational unit configured to compute an output value of an inner product operation of a weight vector and an input vector, wherein
the computational unit computes the output value by using the weight vector defined by reordering weight coefficients in order of smallest value and normalizing, the weight coefficients having been quantized by an exponential representation of a predetermined value of a base greater than 0 but less than 1, the exponential representation having an exponent including a value of an integer greater than 0, and
a number of multiplications in the inner product operation by the computational unit is determined on a basis of the value of the base.

2. The information processing device according to claim 1, further comprising
a multiply-accumulate operation circuit that holds a table that stores address information of input values corresponding to the weight coefficients reordered in order of smallest value, wherein
the computational unit performs the inner product operation by acquiring the input values on a basis of the table.

3. The information processing device according to claim 2, wherein
the address information includes an offset indicating a relative position between addresses.

4. The information processing device according to claim 2, wherein
the table additionally holds multiplication instruction information associated with the address information.

5. The information processing device according to claim 4, wherein
the multiplication instruction information at least includes information designating whether or not to multiply.

6. The information processing device according to claim 2, wherein
the table additionally holds sign information associated with the address information.

7. The information processing device according to claim 1, wherein
the computational unit performs the inner product operation in association with a forward propagation of a neural network.

8. An information processing method, executed by a processor, comprising:
computing an output value of an inner product operation of a weight vector and an input vector, wherein
the computing additionally includes computing the output value by using the weight vector defined by reordering weight coefficients in order of smallest value and normalizing, the weight coefficients having been quantized by an exponential representation of a predetermined value of a base greater than 0 but less than 1, the exponential representation having an exponent including a value of an integer greater than 0, and
a number of multiplications in the inner product operation by the computing is determined on a basis of the value of the base.

9. A non-transitory computer-readable medium having embodied thereon a program, which when executed by a computer causes the computer to execute an information processing method, the method comprising:
computing an output value of an inner product operation of a weight vector and an input vector, wherein
the computing additionally includes computing the output value by using the weight vector defined by reordering weight coefficients in order of smallest value and normalizing, the weight coefficients having been quantized by an exponential representation of a predetermined value of a base greater than 0 but less than 1, the exponential representation having an exponent including a value of an integer greater than 0, and
a number of multiplications in the inner product operation by the computing is determined on a basis of the value of the base.

* * * * *